Sept. 29, 1925.
C. B. WATERS
CLEANER FOR WINDSHIELDS
Filed Oct. 15, 1924
1,555,341
2 Sheets-Sheet 1
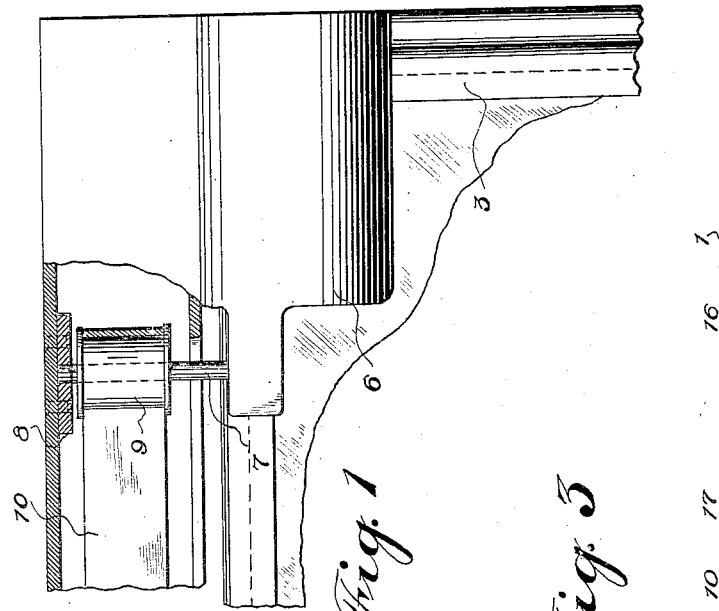
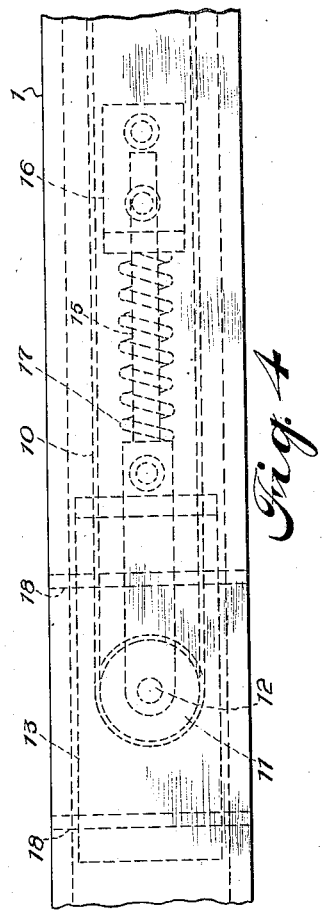
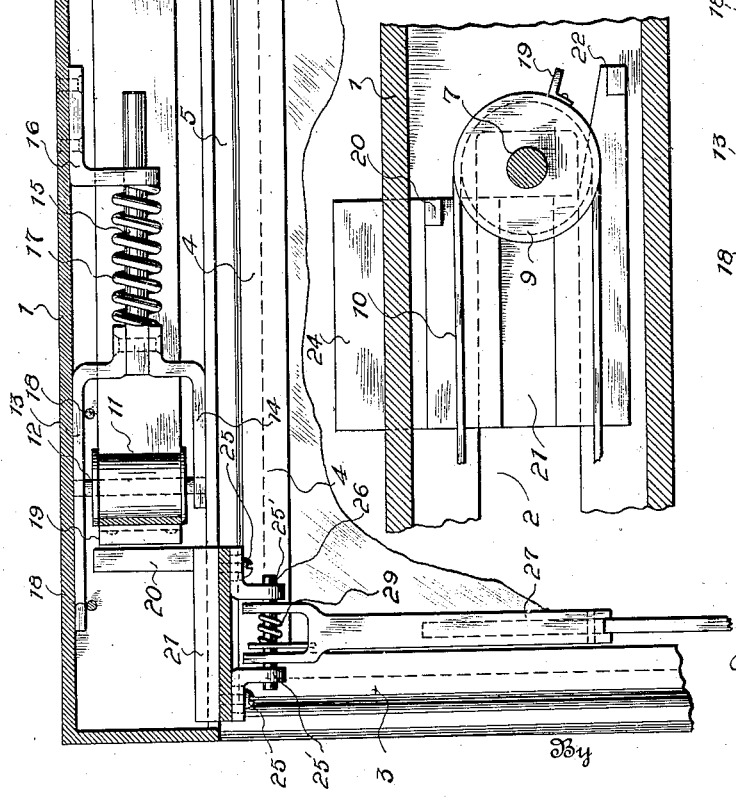
Inventor
Charles B. Waters
By William A. Strauch
Attorney Sept. 29, 1925.     1,555,341
C. B. WATERS
CLEANER FOR WINDSHIELDS
Filed Oct. 15, 1924     2 Sheets-Sheet 2

Inventor
Charles B. Waters
By William A. Strauch
Attorney

Patented Sept. 29, 1925.

1,555,341

UNITED STATES PATENT OFFICE.

CHARLES B. WATERS, OF MONTCLAIR, NEW JERSEY.

CLEANER FOR WINDSHIELDS.

Application filed October 15, 1924. Serial No. 743,837.

*To all whom it may concern:*

Be it known that I, CHARLES B. WATERS, a citizen of the United States, and a resident of Montclair, in the county of Essex and State of New Jersey, have invented certain new and useful Improvements in Cleaners for Windshields, of which the following is a specification.

The present invention relates to cleaners for windshields for automobiles, locomotives, aeroplanes and the like.

More particularly, the invention relates to windshield cleaners of the character mentioned in which the wiper is given a reciprocating motion across the surface to be cleaned rather than an angular oscillating movement, whereby cleaning is effected substantially across the entire outer, inner, or both surfaces of the shield. Various forms of such cleaners have been heretofore proposed in which a traveling chain or a screw shaft are driven continuously in one direction, and a reciprocating wiper carriage actuated thereby, but these prior forms have been subject to serious defects.

The screw form is impractical because of high cost of construction, and due to the vibrations and whipping of the long unsupported screw section, which causes binding of the traveling member, reversals of stress and frequent screw breakages, requires a relatively large amount of power resulting in a serious drain on the batteries when run electrically and rapid overheating of the motors, and high traveling speeds of the carriage cannot be obtained.

The chain drives heretofore proposed have had the orbit of the chain movement in a plane parallel to the surface to be cleaned. The chain is free to vibrate and whip as the vehicle is driven, putting a constant strain on the links, resulting in rapid wear and stretch of the chain. As the chain loosens slightly and whips or vibrates, it is likely to climb the sprocket teeth, bind the movement and stall the motor. This frequently results in breaking of chain or burnout of motor. A further disadvantage of the parallel orbit chain drive is that the carriage projects through a side slot in the casing and permits the ready ingress of snow, rain and sleet. This also may result in broken chain or burnout of motor.

A further material defect of prior construction is the use of fixed connections between the carriage and the traveling member. These usually comprise links and connections which are necessarily light and which wear rapidly shortening the life and usefulness of the cleaner. These connections are such that if the wiper is struck in washing the shield, the wiper member may be bent or broken.

Still a further defect in the prior devices is that no suitable drive motor has been provided which will drive the carriage at the proper high speeds for satisfactory cleaning without consuming too much energy from the batteries.

Accordingly, an object of the invention is to provide an improved simplified and more efficient windshield cleaning device in which troubles due to whipping, stretch and binding of the carriage drive member are remedied.

Other objects of the invention are the provision of automatic means of compensating for the wear and stretch in the driving member and insuring a uniform drive effect; to provide a safety slip drive whereby stalling and burning out of motors becomes impossible; and to provide an improved and simplified drive connection between the carriage drive member and the belt.

Further objects of the invention are to provide simplified wiper carriage structures and supporting guide structures; a novel automatic speed varying drive motor utilizing a minimum of power; a novel combination of windshield structure and wiper structure; and such other objects as may be attained by utilization of the various combinations and subcombinations hereinafter set forth.

Referring to the drawings:

Fig. 1 is a front elevation partially in section of a preferred form of the invention in which the wind shield and cleaner structures are combined.

Fig. 3 is a fragmental sectional plan view showing the carriage structure.

Fig. 4 is a fragmental plan view showing the automatic tensioning mechanism.

Figure 2:
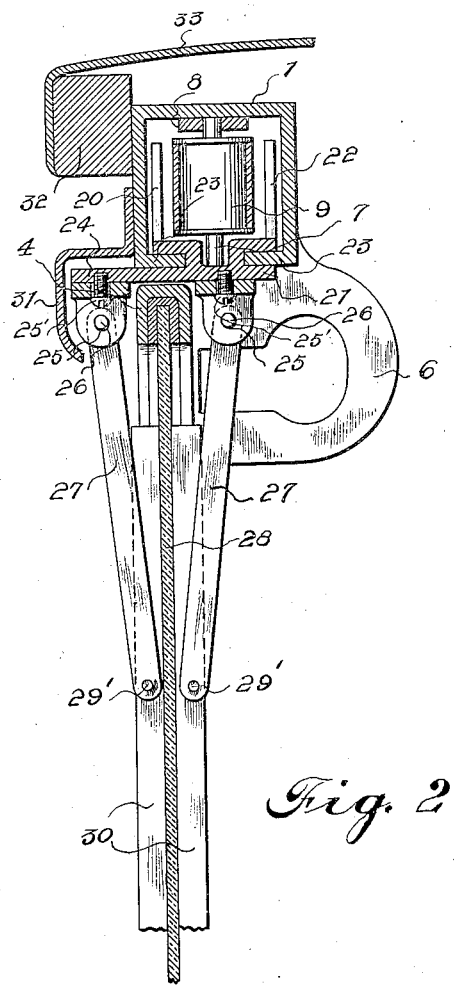
Fig. 2 is sectional side elevation of the form shown in Fig. 1.

The cleaner is enclosed and supported in a casing 1 which is preferably formed of heavy square steel tubing and has a slot 2 formed in the bottom thereof. Casing 1 may be welded to the upright end pieces 3 of a windshield frame just above a glass supporting cross piece 4 which is joined to upright pieces 3 in a manner to leave a narrow slot 5 between casing 1 and cross piece 4. At the right end of the frame work, casing 1 merges into or has welded thereto a drive motor casing 6 in which a suitable drive motor is supported. The upper part of casing 6 preferably communicates with casing 1 to permit proper ventilation and cooling of the drive motor, and suitable vents may be provided in the casing 6. Circulation of air through the motor may be aided by applying to the armature shaft a small stamping in which fan blades are formed. The motor through suitable gearing (not shown) drives a shaft 7 journalled in the casing 6, at its lower end extending upward through slot 2 and journaled at its upper end in a plate 8 secured to the top of casing 1 by riveting or in any other suitable manner. Rigidly secured to shaft 7 is a drive pulley 9. Pulley 9 drives an endless belt 10 which extends to the left and passes around a pulley 11 which is mounted on a spindle 12. Spindle 12 is rotatably journaled in a plate 13 and a supporting extension 14. Members 13 and 14 are rigidly secured to a guide rod 15 which extends to the right and is slidably guided in a hole formed in member 16 which is rigidly secured to the top of casing and extends downward between the sides of belt 10. Interposed between members 13, 14 and 16, and surrounding guide rod 15 is a helical compressed spring 17. Plate 13 is slidably held against the top of casing 1 by pins 18 supported in the sides of the casing 1. It will be noted that members 13, 14 and 15 form a strong sliding support for roller 11 which is forced to the left in Fig. 1 by the compression of spring 17 in such manner that a predetermined tension is maintained in belt 10, and stretching of the belt is compensated.

Riveted to belt 10 is an impact member 19 which on its movement to the left in Fig. 1 engages a drive member 20 extending vertically from carriage 21 and forces the carriage to the left until movement of member 19 around the pulley 11 causes it to disengage from member 20 and to engage drive member 22 of the carriage in its movement to the right, and the carriage will then be forced to the right until member 19 passes around pulley 9 and re-engages member 20. In this manner, continuous movement of belt 10 gives carriage 21 a reciprocating motion across the shield.

Carriage 21 has grooves cut in the sides thereof into which guides 23 of casing formed by the cutting slot 2, slidably fit and form guides for the movement of carriage. Carriage 21 may be made of a metal such as brass which will slide easily on steel guides 23. Formed on carriage 21 is an extension 24 which passes through slot 5 to the outside of the shield. Secured to the lower part of carriage preferably in adjustable manner by means of screws 25 fitting into elongated slots, are supporting lugs 25'.

Pivotally supported from pins 26 in lugs 25' are wiper supporting arms 27 which are forced inward to the glass 28 by means of helical springs 29 wound around pins 26. Pivoted to arms 27 at points 29' are wiper members 30. If it is desired to wipe only the outer surface of the glass, the inner wiper and supporting parts may be removed. To prevent slot 5 from admitting wind, dirt and rain, an apron or shield 31 is secured to the outside of casing 1. With the shield in closed position the upper part of casing 1 will rest against the vehicle top front frame member 32 under the top 33. It will be noted that all of the working parts of the cleaner are in protected position inside of the vehicle.

Figure 5:
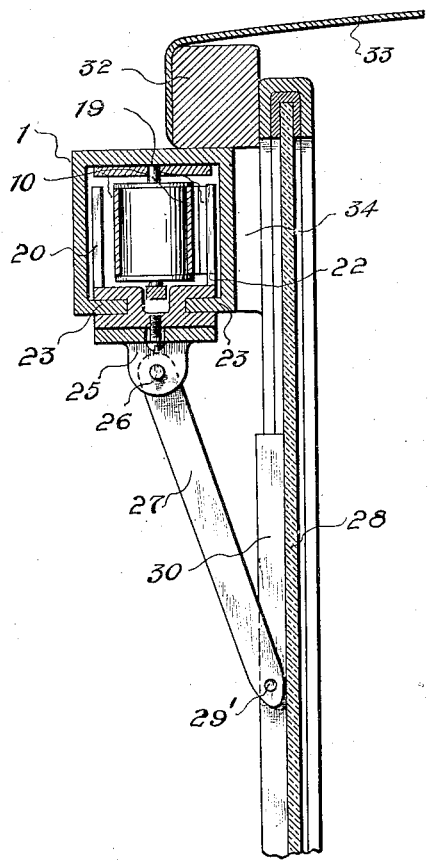
Fig. 5 is a sectional side elevation showing the cleaner as applied to an independent windshield.
Figure 6:
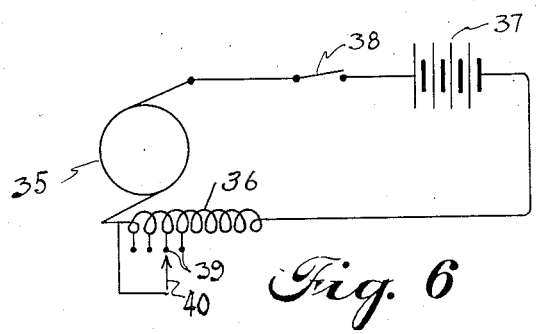
Fig. 6 is a circuit diagram of the improved drive motor arrangement.

The working parts of the form shown in Fig. 5 are exactly the same as the form shown in Figs. 1 to 4 except that extension 24 of carriage 21 with its wiper is removed, and instead of being part of the windshield frame structure, the casing 1 is secured to the outside of the windshield frame just below vehicle top frame piece 32 by means of supporting extensions 34 secured to casing 1. The motor is, however, firmly placed on the right, looking out through the wind shield. It will be noted that owing to the offset carriage construction and the provision for adjustment of lugs 25', the wipers 30 may be positioned so as to clean the glass on the left to the left upright 3 of the frame, so that the driver has a clear vision on the left of the shield, a result not heretofore obtained. For right hand drive machines, the motor should be placed on the left of the driver.

Although any usual form of electrical drive motor may be utilized, a special motor is preferably used. I have found that much more efficient results and more satisfactory operation are obtained if a series direct current motor is utilized. The armature 35 of a series motor is provided with a series field 36 and is connected to the terminals of battery 37 through a switch 38. Taps 39 are brought out from certain of the turns of winding 36, and a switch 40 is provided adapted to engage taps 39 to short circuit part of winding 36. When switch 38 is closed, motor 35 will start into operation and will drive belt 10, at a speed depending upon the condition of the windshield. If the shield is dry, the speed of operation of the motor will be slow because of the greater load on the carriage but the current drawn from the battery will not be excessive. As soon, however, as the shield becomes wet, due to rain or snow, the friction between wiper 30 and the shield will decrease and the motor automatically speeds up, so that as the need for rapid operation occurs the speed automatically increases. By varying the number of turns in field 36 through operating switch 40, the speed of the motor may be varied due to variation of field flux. The motor automatically speeds up as the shield becomes wet and automatically slows down as the shield becomes dry so that less current is drawn from the battery and much greater cleaning efficiency is obtained than by the use of other types of motors.

The spring 17 is of such strength and maintains such a tension in belt 10 that if the carriage should bind for any reason, the belt will slip before the motor can stall, so that motor will not burn out. If desired, a chain may replace belt 10, and the spring 17 will then take up the stretch and wear in the chain.

Having described preferred embodiments of the invention, what is desired to be secured by Letters Patent and claimed new is:

1. A reciprocating mechanism comprising a casing; a carriage; tongue and groove connections between said casing and said carriage upon which said carriage is guided and reciprocated; an endless carrier disposed in said casing above said carriage and movable with its orbit of motion parallel to the path of movement of said carriage; an impact member on said carriage; and a pair of projections formed on said carriage on opposite sides of said carrier and so positioned with relation to each other and said impact member that as the impact member travels with the carrier it will cause a reciprocating motion of said carriage.

2. A mechanism comprising a reciprocating carriage; a pair of projections extending from opposite sides of said carriage and displaced in the direction of travel of said carriage with relation to each other; an endless carrier disposed between and in the plane of said projections; and an impact member secured to said carrier adapted to alternately engage said projections to reciprocate said carriage.

3. A reciprocating mechanism comprising a casing; a carriage adapted to reciprocate in the lower part of said casing; an endless carrier disposed in said casing above the path of movement of said carriage and with its orbit of motion in a path parallel to the path of movement of said carriage; an impact member secured to said carrier; and a pair of projections formed on said carriage extending upward on opposite sides of said endless carrier and so positioned with relation to each other and to said impact member that as the impact member travels with the carrier it will cause a reciprocating movement of said carriage.

4. A reciprocating mechanism comprising a casing; a carriage adapted to reciprocate in said casing; an endless carrier adjacent said carriage; an impact member secured to said carrier; a pair of projections formed on said carriage on opposite sides of said carrier so positioned with relation to each other and to said impact member that as said impact member travels with said carrier it will cause a reciprocating movement of said carriage substantially throughout the entire length of said casing; and means at each end of said casing for preventing said carriage from being moved so that said projections are out of the path of movement of said impact member.

5. A reciprocating mechanism comprising an endless movable carrier; a reciprocating carriage movable in a path at one side of and extending beyond the length of said carrier; an impact member secured to and movable with said carrier; a pair of projections secured to said carriage and so positioned with relation to said impact member and to each other that a reciprocating movement of said carriage is produced by the movement of said endless carrier and so that the center of impact applied by said impact member to said projections is substantially on the center of said carrier.

6. A reciprocating mechanism comprising an endless flexible belt; a pair of flanged pulleys around which said belt passes; a driving member secured to the outer surface of said belt; a reciprocating carriage movable in a path at one side of and extending beyond said pulleys; and means actuated by said driving member for producing a reciprocating motion of said carriage so arranged that the center of the driving force applied by said member to said means is substantially at the center of said belt.

Signed at New York in the county of New York and State of New York this 23rd day of September A. D. 1924.

CHARLES B. WATERS.